US010233026B2

(12) United States Patent
Rimmington

(10) Patent No.: US 10,233,026 B2
(45) Date of Patent: Mar. 19, 2019

(54) CONVEYOR SYSTEM AND METHOD FOR REMOVING SLACK IN CONVEYOR

(71) Applicant: Joy MM Delaware, Inc., Wilmington, DE (US)

(72) Inventor: Gareth Rimmington, Barnsley (GB)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/618,364

(22) Filed: Jun. 9, 2017

(65) Prior Publication Data
US 2017/0355529 A1 Dec. 14, 2017

Related U.S. Application Data

(60) Provisional application No. 62/348,378, filed on Jun. 10, 2016.

(51) Int. Cl.
*B65G 17/38* (2006.01)
*B65G 19/10* (2006.01)
*B65G 23/06* (2006.01)
*B65G 23/36* (2006.01)
*B65G 23/44* (2006.01)
*E21C 27/02* (2006.01)
*E21F 13/06* (2006.01)

(52) U.S. Cl.
CPC ............ *B65G 23/36* (2013.01); *B65G 17/38* (2013.01); *B65G 19/10* (2013.01); *B65G 23/06* (2013.01); *B65G 23/44* (2013.01); *E21F 13/06* (2013.01); *B65G 2201/045* (2013.01); *B65G 2207/30* (2013.01); *E21C 27/02* (2013.01)

(58) Field of Classification Search
CPC ........ B65G 17/38; B65G 23/36; B65G 23/44; B65G 2207/30; B65G 27/02; B65G 2201/045; B65G 23/04; B65G 23/06; B65G 23/18; B65G 23/10; B65G 23/12; B65G 23/24; B65G 23/26; B65G 19/08; B65G 19/10; E21F 13/06
See application file for complete search history.

(56) References Cited

U.S. PATENT DOCUMENTS 1,437,718 A  12/1922 Burns
1,529,635 A   3/1925 Newhouse
(Continued)

FOREIGN PATENT DOCUMENTS

GB  1014138 A  * 12/1965  ............. B65G 17/00
GB  2044709 A    10/1980

OTHER PUBLICATIONS

International Search Report and Written Opinion for Application No. PCT/US2017/036715 dated Aug. 21, 2017 (17 pages).

*Primary Examiner* — Mark A Deuble
(74) *Attorney, Agent, or Firm* — Michael Best & Friedrich LLP

(57) ABSTRACT

A method is provided for removing slack in a chain conveyor driven between a first sprocket and a second sprocket, the first sprocket and the second sprocket rotating in a first direction. The method includes: locking the second sprocket to prevent rotation of the second sprocket in a second direction opposite the first direction; operating the first sprocket in the second direction to position a slack portion between the first sprocket and the second sprocket; and removing at least one chain link from the slack portion.

19 Claims, 8 Drawing Sheets

(56) References Cited

U.S. PATENT DOCUMENTS

| | | | |
|---|---|---|---|
| 1,530,478 A | 3/1925 | Carlson | |
| 1,976,676 A | 10/1934 | Williams | |
| 2,725,976 A | 12/1955 | Madeira | |
| 2,739,693 A | 3/1956 | Ames | |
| 2,879,907 A | 3/1959 | Mickel | |
| 2,918,020 A | 12/1959 | Henderson et al. | |
| 3,871,514 A | 3/1975 | Hewitt et al. | |
| 4,128,164 A | 12/1978 | Sandberg | |
| 4,160,391 A | 7/1979 | Monks | |
| 4,356,912 A | 11/1982 | Nitschke | |
| 4,872,548 A | 10/1989 | Masuda et al. | |
| 5,895,332 A | 4/1999 | Olson et al. | |
| 5,913,403 A | 6/1999 | Merten et al. | |
| 6,029,799 A | 2/2000 | Weigel et al. | |
| 6,527,097 B2 | 3/2003 | Dreyer | |
| 7,134,544 B1 | 11/2006 | Kilper et al. | |
| RE40,766 E | 6/2009 | Dreyer | |
| 9,440,797 B1* | 9/2016 | Rimmington | B65G 43/00 |
| 9,527,675 B2* | 12/2016 | Tout | B65G 23/44 |
| 2011/0180368 A1 | 7/2011 | Rockstead | |
| 2011/0181096 A1* | 7/2011 | Hill | E21C 29/02 |
| | | | 299/43 |
| 2013/0015043 A1* | 1/2013 | Tout | B65G 23/44 |
| | | | 198/810.04 |
| 2013/0068594 A1 | 3/2013 | Worthington et al. | |
| 2014/0262693 A1 | 9/2014 | de Lore et al. | |

\* cited by examiner

CONVEYOR SYSTEM AND METHOD FOR REMOVING SLACK IN CONVEYOR

CROSS-REFERENCE TO RELATED APPLICATIONS

This application claims the benefit of prior-filed U.S. Provisional Patent Application No. 62/348,378, filed Jun. 10, 2016, the entire contents of which are incorporated by reference.

BACKGROUND

The present disclosure relates to conveyors, and particularly to chain conveyors.

Mining operations typically include a cutting mechanism for breaking or cutting material from a mine face. In some embodiments, the material is deposited on one or more conveyors (e.g., a face conveyor) and carried away from the mine face. The conveyors may include one or more parallel chains driven by rotating sprockets. Over time, operation of the face conveyor may cause the chain(s) to wear and become elongated.

SUMMARY

In one embodiment, a method is provided for removing slack in a chain conveyor driven between a first sprocket and a second sprocket, the first sprocket and the second sprocket rotating in a first direction. The method includes: locking the second sprocket to prevent rotation of the second sprocket in a second direction opposite the first direction; operating the first sprocket in the second direction to position a slack portion between the first sprocket and the second sprocket; and removing at least one chain link from the slack portion.

In another embodiment, a conveyor system includes a first sprocket operable to rotate in a first direction and a second direction, a second sprocket operable to rotate in the first direction and the second direction, and a chain extending between the first sprocket and the second sprocket. The chain is nominally driven by at least one of the first sprocket and the second sprocket in the first direction, and the chain includes a plurality of flight to convey material. The conveyor system further includes a locking mechanism selectively engageable with the second sprocket to inhibit the second sprocket from rotating in the second direction In yet another embodiment, a conveyor system includes a first sprocket driven by a first motor and operable to rotate in a first direction and a second direction, a second sprocket driven by a second motor and operable to rotate in the first direction and the second direction, and a chain extending between the first sprocket and the second sprocket. The chain is nominally driven by at least one of the first sprocket and the second sprocket in the first direction, and the chain includes a plurality of flights to convey material. The conveyor system further includes a tensioner unit selectively engageable with the first sprocket and operable to drive the first sprocket in the second direction independently of the first motor. The conveyor system further includes a locking mechanism engageable with the second sprocket while the tensioner unit drives the first sprocket in the second direction, the locking mechanism inhibiting the second sprocket from rotating in the second direction.

Other aspects will become apparent by consideration of the detailed description and accompanying drawings.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, this disclosure relates to a chain conveyor system including a mechanism for locking and preventing counter-rotation of one or more conveyor sprockets. A drive mechanism for one of the sprockets includes a pawl unit with a one-way clutch for engaging an input shaft of the sprocket. The pawl unit permits the input shaft and the sprocket to rotate in a forward direction during normal operation, but prevents any rotation in a reverse direction. When another sprocket is operated in the reverse direction, the one sprocket locks one end of the chain and can expose a slack portion of the chain.

Figure 1:
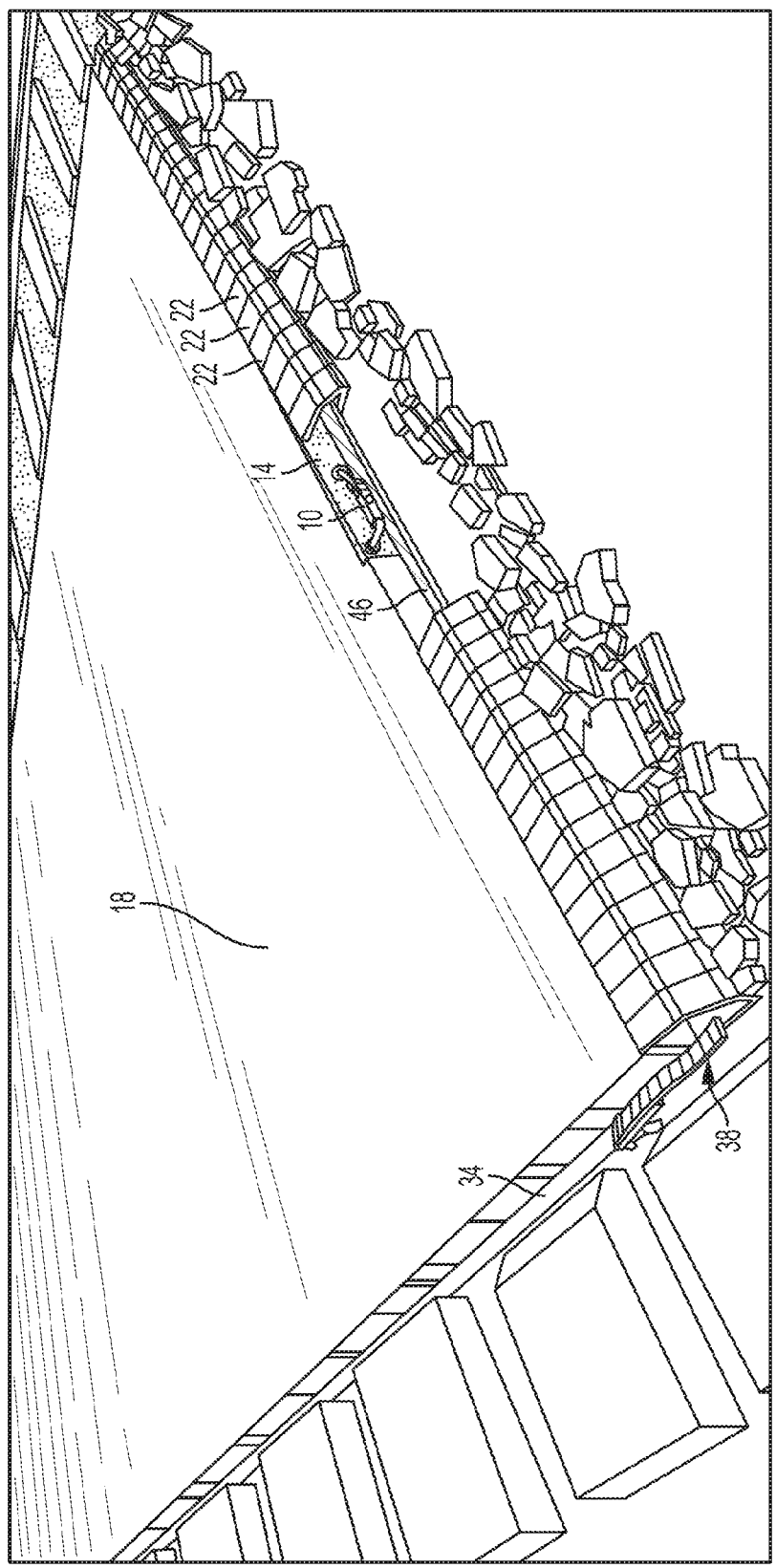
FIG. 1 is a perspective view of a mining operation.
Figure 2:
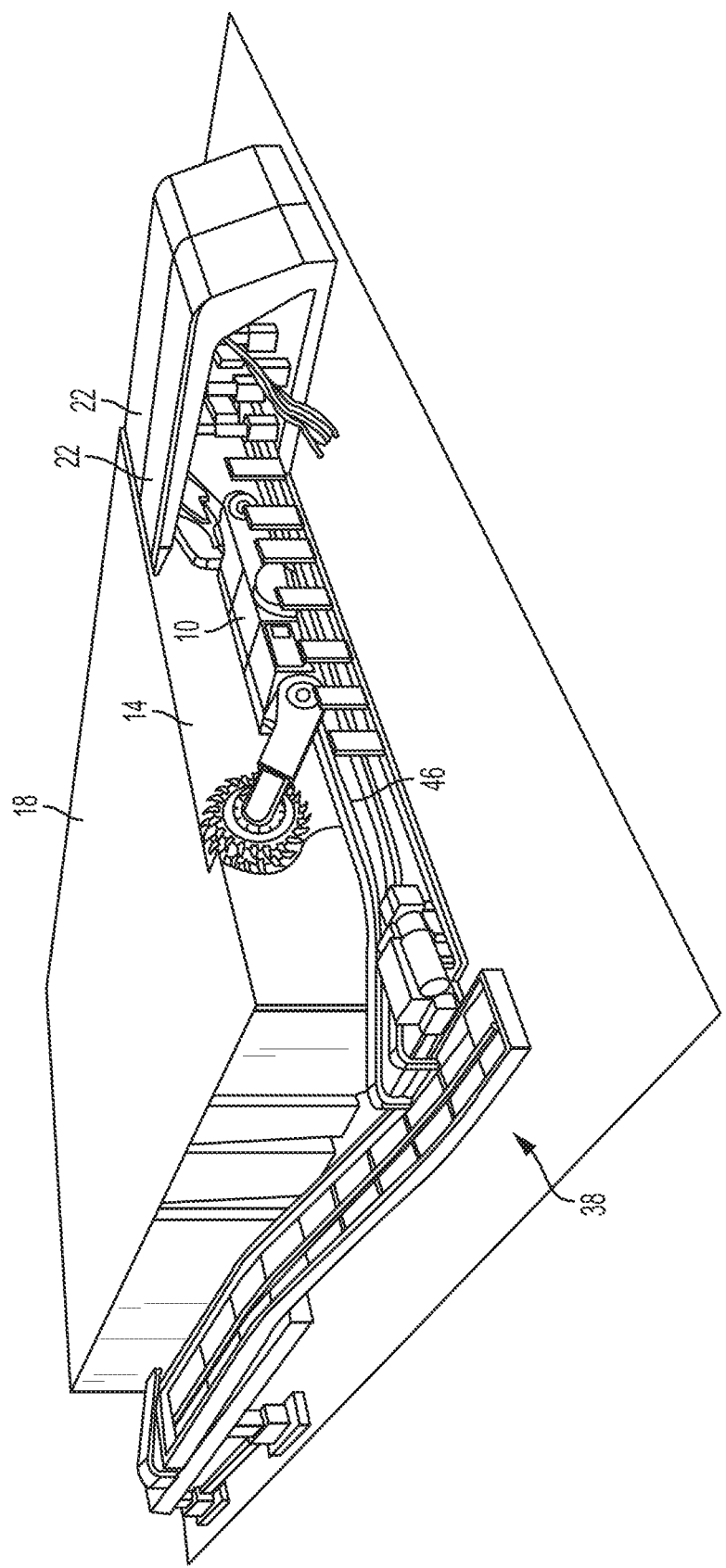
FIG. 2 is an enlarged perspective view of a portion of the mining operation of FIG. 1.

FIGS. 1 and 2 illustrate an excavation operation (e.g., a longwall mining operation). A mining machine 10 excavates material from a mine face 14 of a mineral seam 18, and progresses through the seam 18 as material is removed. In the illustrated embodiment, the mining machine 10 is a conventional longwall shearer, and the structure and operation of the shearer may be readily understood by a person of ordinary skill in the art. In other embodiments, a different type of mining machine may be used. Roof supports 22 are aligned in a row along the length of the mine face 14 to provide protection (a portion of the roof supports 22 are removed in FIGS. 1 and 2 to illustrate the mining machine 10 and mine face 14). As the shearer 10 removes material from the mine face 14, the cut material is directed onto a face conveyor 46 that conveys the material generally parallel to the mine face 14 and toward a main gate conveyor 34 (FIG. 1). In the illustrated embodiment, the face conveyor 46 deposits the cut material on a beam stage loader 38 positioned adjacent an end of the mine face 14. In some embodiments, the cut material may pass through a sizer or crusher (not shown) before or after it is deposited on the beam stage loader 38.

Figure 3:
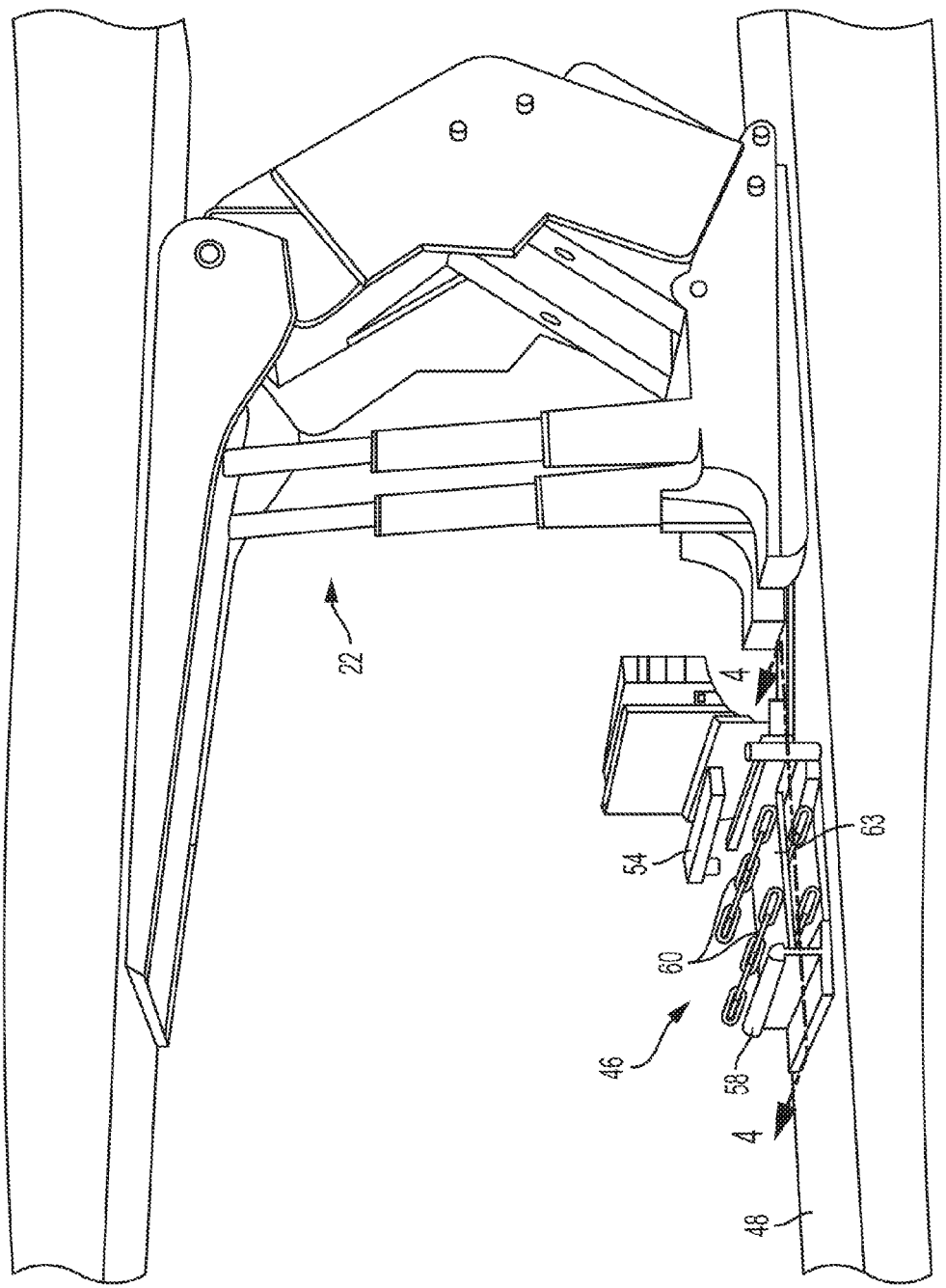
FIG. 3 is a perspective view of a portion of a conveyor and a roof support.
Figure 4:
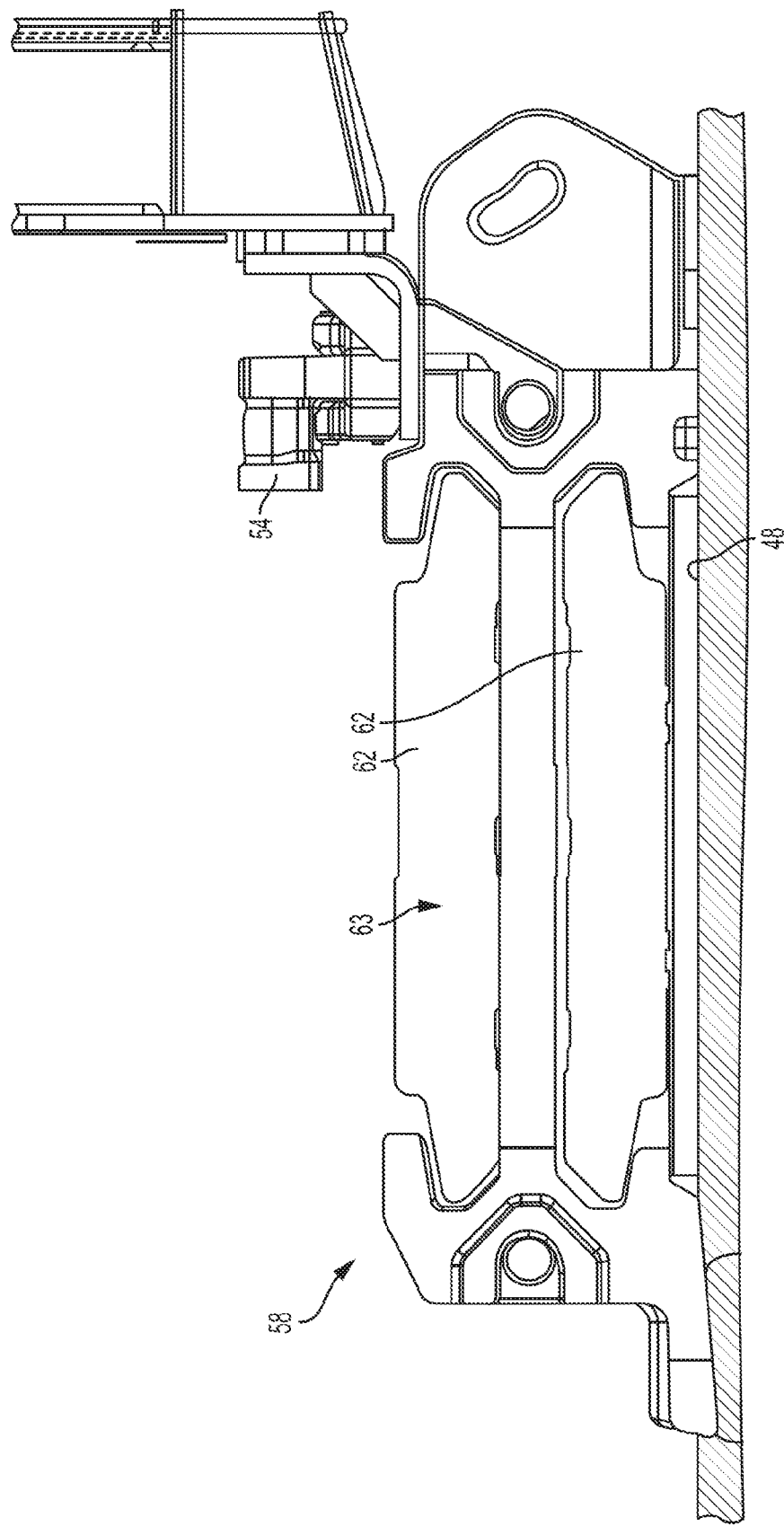
FIG. 4 is a section view of the conveyor of FIG. 3, viewed along section 4-4.

With reference to FIGS. 3 and 4, the face conveyor 46 includes a conveyor pan structure and a conveying element. In some embodiments, the conveyor pan structure is formed as multiple individual pan sections 58 that are interconnected with one another. The conveying element may be a chain conveyor including a pair of chains 60 and flight bars 62 (FIG. 4) coupled between the chains 60 at regular intervals. As the flight bars 62 are drawn by the chains 60, the flight bars 62 move sequentially across each pan sections 58 and move cut material along the pan sections 58. Each pan section 58 includes a pan 63 supported on a ground surface 48. The pan 63 supports the structure of the face conveyor 46, such as the flight bars 62 and the chains 60 extending between the flight bars 62. In the illustrated embodiment, each pan section 58 is coupled to a rack 54. The mining machine 10 may include a pinion (not shown) that engages the rack 54 to move the mining machine 10 along the mine face 14 (FIG. 2).

Figure 5:
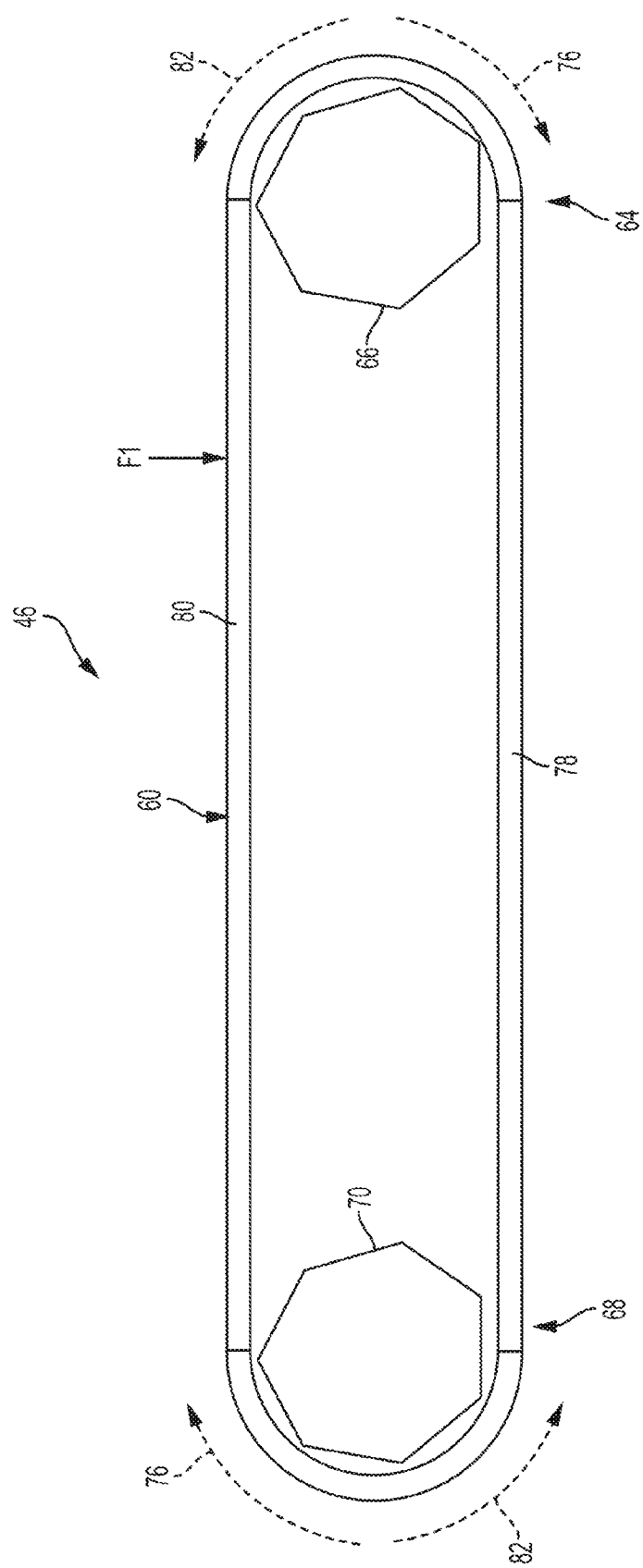
FIG. 5 is a schematic view of the conveyor of the mining machine.
Figure 6:
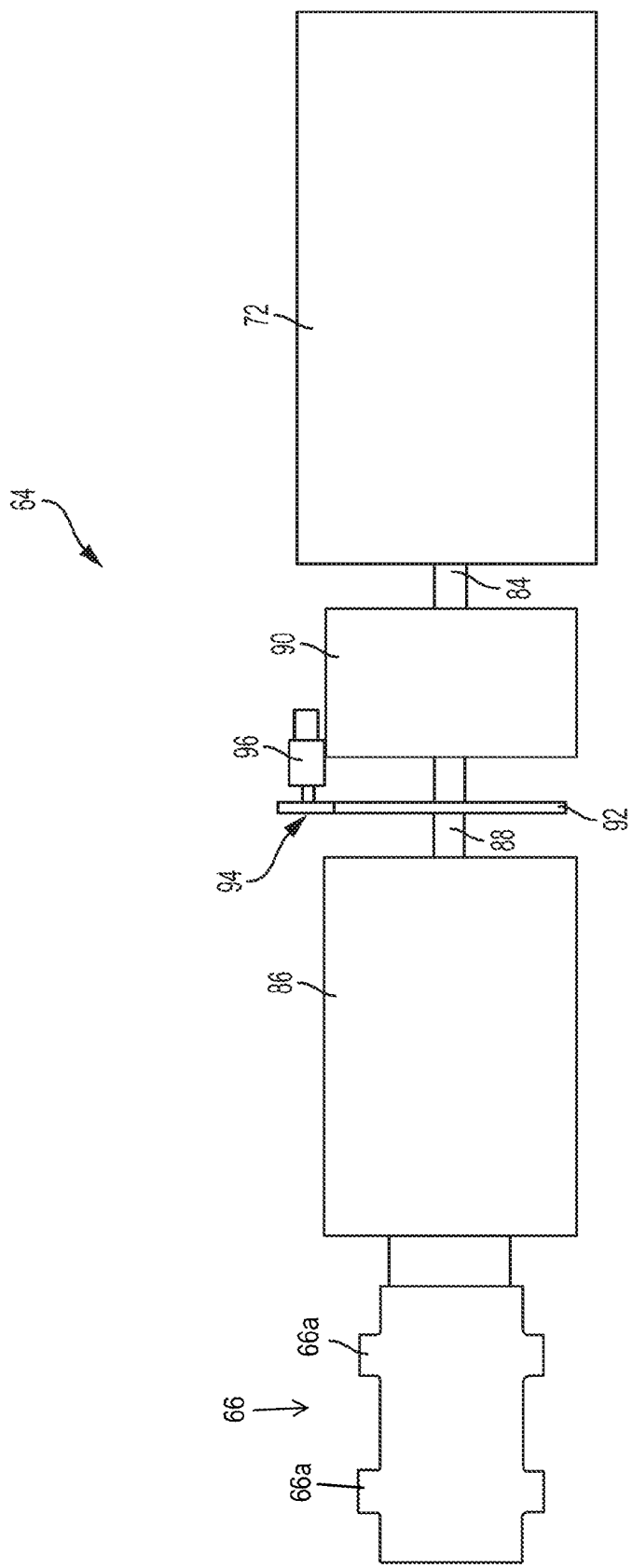
FIG. 6 is a schematic view of a first drive assembly of the conveyor.
Figure 7:
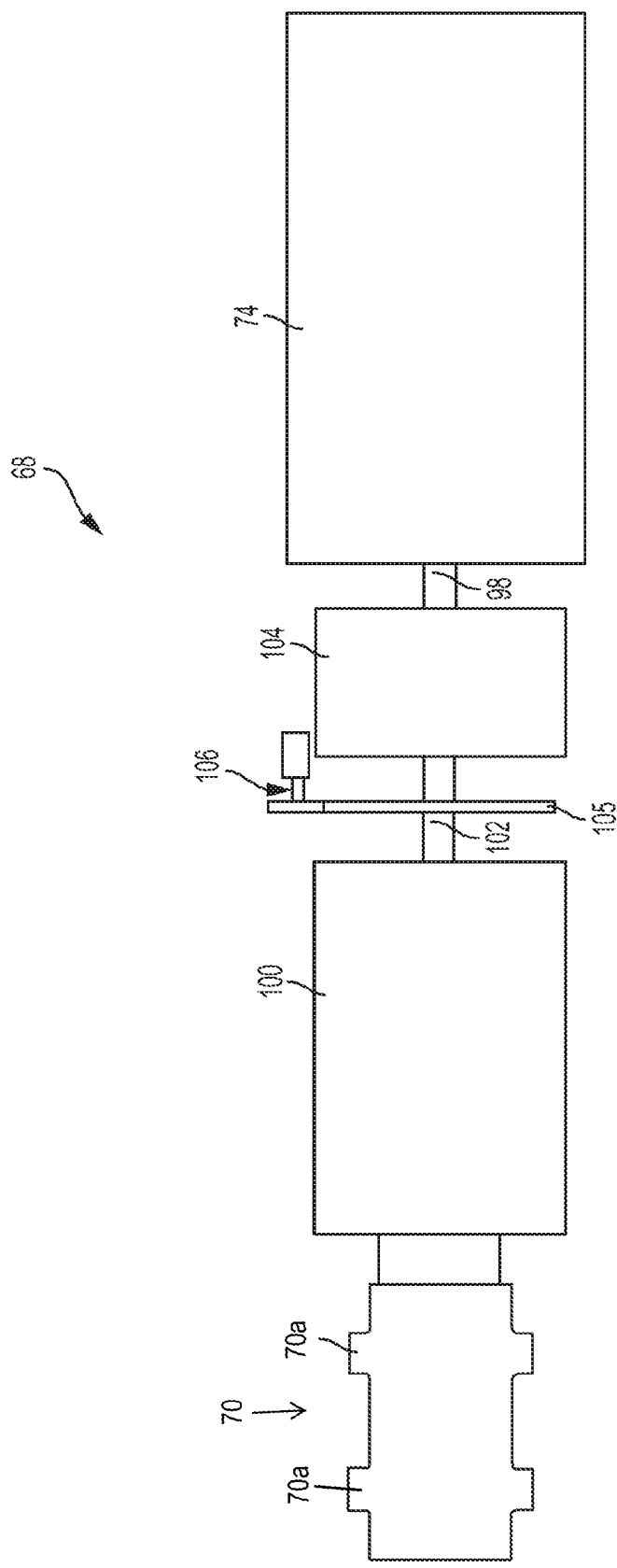
FIG. 7 is a schematic view of a second drive assembly of the conveyor.

With reference to FIGS. 5-7, the face conveyor 46 further includes a first drive assembly 64 having a first sprocket 66 and a second drive assembly 68 having a second sprocket 70. Each sprocket 66, 70 intermeshes with the chains 60 in order to drive the chains 60 in an endless loop between a first end and a second end. The sprockets 66, 70 are illustrated schematically in FIG. 5 as multi-sided polygons (e.g., seven-sided polygons), and a person of skill in the art will understand that each side or vertex may represent a tooth for engaging links of the chains 60. As shown in FIGS. 6 and 7, each sprocket 66, 70 may include two sets of teeth 66a, 70a, respectively, with each set engaging a separate chain 60. In other embodiments, the sprockets 66, 70 may include fewer or more sets of teeth, and each set of teeth may include fewer or more teeth. Also, although the sprockets 66, 70 are illustrated schematically as circles in FIG. 8, it is understood that the sprockets 66, 70 in FIG. 8 include teeth for driving the chains 60.

In the illustrated embodiment of FIGS. 5-7, the first drive assembly 64 includes a first motor 72 (FIG. 6) driving the first sprocket 66 and the second drive assembly 68 includes a second motor 74 (FIG. 7) driving the second sprocket 70. The first motor 72 drives the first sprocket 66, for example, in a first direction 76 to pull a lower portion or lower run 78 of the chains 60 while the second motor 74 drives the second sprocket 70, for example, in the first direction 76 to pull an upper portion or upper run 80 of the chains 60. The first and second motors 72, 74 are also capable of driving the sprockets 66, 70 in a second direction 82 opposite the first direction 76. In other embodiments, a single motor may be used to directly or indirectly drive one or more of the sprockets.

With reference to FIG. 6, the motor 72 of the first drive assembly 64 includes a first drive shaft 84 coupled to a first gearbox 86 via a first gearbox input shaft 88. A first coupling mechanism 90 couples the first drive shaft 84 to the first gearbox input shaft 88. The first gearbox 86, in turn, transmits power from the first gearbox input shaft 88 to the first sprocket 66. The first drive assembly 64 also includes a first spur wheel 92 fixedly coupled to the first gearbox input shaft 88. As illustrated, the first spur wheel 92 is engaged with a hydraulic tensioner unit 94 and integral brake 96. However, the hydraulic tensioner unit 94 and the brake 96 may be disengaged from the first spur wheel 92. The hydraulic tensioner unit 94 and integral brake 96 engages the first spur wheel 92 to drive and maintain an angular position of the first sprocket 66 relative to the second sprocket 70 when the first motor 72 is deactivated for purposes described in further detail below.

With reference to FIG. 7, the motor 74 of the second drive assembly 68 includes a second drive shaft 98 coupled to a second gearbox 100 via a second gearbox input shaft 102. A second coupling member 104 couples the second drive shaft 98 to the second gearbox input shaft 102. The second gearbox 100 of the second drive assembly 68 transmits power from the second gearbox input shaft 102 to the second sprocket 70. The second drive assembly 68 also includes a second spur wheel 105 fixedly coupled to the second gearbox input shaft 102. The second spur wheel 105 is engaged with a locking mechanism 106 to inhibit the second sprocket 70 from rotating in the second direction 82 (FIG. 5). However, the locking mechanism 106 may be disengaged from the second spur wheel 105. The locking mechanism 106 engages the second spur wheel 105 when the second motor 74 is deactivated for purposes described in further detail below.

In operation, the gearboxes 86, 100 of the first and second drive assemblies 64, 68 transmit power from the motors 72, 74 to drive the first and second sprockets 66, 70 in the first direction 76 (FIG. 5). Accordingly, the chains 60 and flight bars 62 of the face conveyor 46 are driven to transport cut or "won" material away from the mining machine 10. When the cut material is removed from the mine wall 34 and deposited on the face conveyor 46, the cut material exerts a force F1 (FIG. 5) on the upper run 80 of the face conveyor 46. The force F1 is oriented generally perpendicular to the direction of motion of the chains 60. The force F1 induces large tensile stress in the chains 60. Over time, the tensile stress exerted on the chain links and the wear on the individual links causes the chains 60 to become elongated. As a result of the elongation, the chains 60 are no longer at an optimal tension to transport the cut material. When the chains 60 become elongated beyond a predetermined level, an operator shortens the chains 60 to increase the tension in the chain 60 to a desired level.

Figure 8:
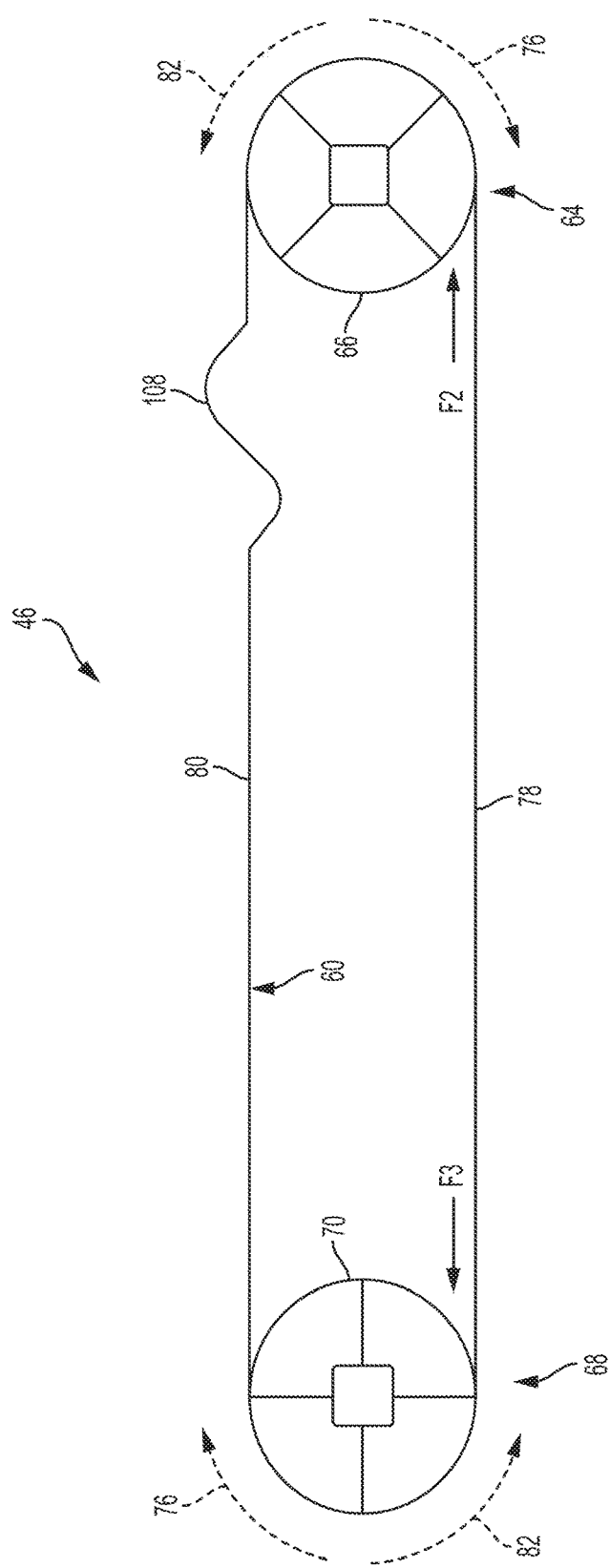
FIG. 8 is a schematic view of the conveyor, illustrating a slack chain portion.

Referring now to FIG. 8, in order to shorten the chains 60, one or more links of the chains 60 are removed by exposing a slack portion 108 of the chains 60. Prior to exposing the slack portion 108, the motors 72, 74 of the first and second drive assemblies 64, 68 are deactivated. At this point, the hydraulic tensioner unit 94 and the integral brake 96 (FIG. 6) engage the first spur wheel 92 and the locking mechanism 106 (FIG. 7) engages the second spur wheel 105.

Once the hydraulic tensioner unit 94 is engaged with the first spur wheel 92, the hydraulic tensioner unit 94 rotates the first spur wheel 92 to drive the first sprocket 66 in the second direction 82. While the first sprocket 66 is rotating in the second direction 82, the locking mechanism 106 is engaged with the second spur wheel 105 to inhibit rotation of the second sprocket 70 in the second direction 82. In other words, the first sprocket 66 rotates relative to the second sprocket 70 when the hydraulic tensioner unit 94 drives the first sprocket 66. As such, the first sprocket 66 applies a force F2 on the lower run 78 to tension the lower run 78, while the slack portion 108 is exposed in the upper run 80. Meanwhile, the force F2 is applied to the chains 60 via the first sprocket 66 and a force F3 is applied to the chains 60 via the second sprocket 70, as shown in FIG. 8. The integral brake 96 of the first drive assembly 64 maintains the angular position of the first sprocket 66 relative to the second sprocket 70 by holding the position of first spur wheel 92 while the second spur wheel 105 is locked via the locking mechanism 106.

Once the slack portion 108 is exposed in the chains 60, an operator cuts and removes one or more links from each chain 60. The chains 60 are subsequently re-joined together. While a majority of the slack 108 is removed from the chains 60, a residual amount of slack may remain. The residual slack in the chains 60 may be dissipated, for example, by the tensioner unit 94 and integral brake 96 working together to gradually distribute the tension from the lower run 78 and forces F2, F3 from the sprockets 66, 70 throughout the rest of the chain 60.

Chain conveyors typically are formed with large, strong individual links. The disclosed tensioner unit allows the chain to be tensioned without the use of conventional heavy, in-pan chain sprag devices or other heavy ancillary mechanisms. The tensioner unit includes a series of toothed wheels which decrease the required holding torque (when the lower run is tensioned) to a level which the locking mechanism can safely withstand. Also, the tensioner unit may be engaged by a screw thread to prevent inadvertent engagement with the spur wheel. Specifically, the screw thread is used to engage or disengage the tensioner unit with the spur wheel. Maneuvering the tensioner unit into and out of engagement is achieved by rotating a screw rod clockwise and counterclockwise. The screw rod provides a mechanism for positively engaging the tensioner unit and the spur wheel with low risk of the tensioner unit inadvertently engaging the spur wheel when the conveyor is running and disengaging when the tensioner unit is in use.

Although aspects have been described in detail with reference to certain preferred embodiments, variations and modifications exist within the scope and spirit of one or more independent aspects as described.

What is claimed is:

1. A method for removing slack in a chain conveyor driven between a first sprocket and a second sprocket, the first sprocket and the second sprocket rotating in a first direction, the method comprising:
   locking the second sprocket to prevent rotation of the second sprocket in a second direction opposite the first direction;
   operating the first sprocket in the second direction to position a slack portion between the first sprocket and the second sprocket; and
   removing at least one chain link from the slack portion.

2. The method of claim 1, further comprising rotating the first sprocket in the first direction via a first motor, rotating the second sprocket in the first direction via a second motor, and rotating the first sprocket and the second sprocket simultaneously in the first direction to convey cut material from a mine face.

3. The method of claim 1, further comprising rotating the first sprocket relative to the second sprocket to tension a lower run of the conveyor while positioning the slack portion in an upper run of the conveyor.

4. The method of claim 1, further comprising recoupling the conveyor after removing a chain link from the slack chain portion and dissipating any residual slack throughout the chain such that tension in an upper run and a lower run are substantially equal.

5. The method of claim 1, further comprising providing a tensioner unit for rotating the first sprocket in the second direction when the second sprocket is locked.

6. The method of claim 5, further comprising providing an integral brake selectively coupled to the first sprocket, wherein the integral brake engages with the first sprocket as the tensioner unit drives the first sprocket in the first direction to inhibit rotation of the first sprocket in the first direction.

7. A conveyor system comprising:
   a first sprocket operable to rotate in a first direction and a second direction;
   a second sprocket operable to rotate in the first direction and the second direction;
   a chain extending between the first sprocket and the second sprocket, the chain nominally driven by at least one of the first sprocket and the second sprocket in the first direction, the chain including a plurality of flights for conveying material;
   a locking mechanism selectively engageable with the second sprocket to inhibit the second sprocket from rotating in the second direction; and
   a tensioner unit selectively engageable with the first sprocket, the tensioner unit being operable to rotate the first sprocket in the second direction when the locking mechanism is engaged with the second sprocket.

8. The conveyor system of claim 7, further comprising a first motor to rotate the first sprocket and a second motor to rotate the second sprocket, wherein the first sprocket and the second sprocket are both rotated in the first direction simultaneously to convey cut material from a mine face.

9. The conveyor system of claim 7, wherein the first sprocket is rotated relative to the second sprocket when the locking mechanism engages the second sprocket to position a slack portion in an upper run of the chain.

10. The conveyor system of claim 7, wherein one or more chain links of the chain are removable from the slack portion.

11. The conveyor system of claim 10, wherein the chain is recoupled together after removing the one or more chain links from the slack portion and any residual slack portion is dissipated throughout the chain such that tension in an upper run and a lower run are substantially equal.

12. The conveyor system of claim 7, further comprising an integral brake selectively engageable with the first sprocket, the integral brake is operable to engage the first sprocket as the tensioner unit drives the first sprocket in the second direction to inhibit rotation of the first sprocket in the first direction.

13. The conveyor system of claim 7, wherein the tensioner unit drives the first sprocket in the second direction causing the locking mechanism to engage the second sprocket such that rotation of the second sprocket is inhibited, thereby introducing tension in a lower run of the chain and a slack portion in an upper run of the chain.

14. The conveyor system of claim 13, wherein one or more chain links of the chain are removable from the slack portion.

15. The conveyor system of claim 14, wherein the chain is recoupled together after removing the one or more chain links from the slack portion and any residual slack portion is dissipated throughout the chain such that tension on the upper run and the lower run are substantially equal.

16. A conveyor system comprising:
   a first sprocket driven by a first motor and operable to rotate in a first direction and a second direction;
   a second sprocket driven by a second motor and operable to rotate in the first direction and the second direction;
   a chain extending between the first sprocket and the second sprocket, the chain nominally driven by at least one of the first sprocket and the second sprocket in the first direction, the chain including a plurality of flights to convey material;

a tensioner unit selectively engageable with the first sprocket and operable to drive the first sprocket in the second direction independently of the first motor; and a locking mechanism engageable with the second sprocket while the tensioner unit drives the first sprocket in the second direction, the locking mechanism inhibiting the second sprocket from rotating in the second direction.

17. The conveyor system of claim 16, wherein the first sprocket is rotated relative to the second sprocket when the locking mechanism engages the second sprocket, thereby introducing tension in a lower run of the chain and a slack portion in an upper run of the chain.

18. The conveyor system of claim 16, wherein one or more chain links of the chain are removable from the slack portion.

19. The conveyor system of claim 18, wherein the chain is recoupled together after removing the one or more chain links from the slack portion and any residual slack portion is dissipated throughout the chain such that tension in an upper run and a lower run are substantially equal.

\* \* \* \* \*